US011697492B2

(12) United States Patent
Alger et al.

(10) Patent No.: US 11,697,492 B2
(45) Date of Patent: Jul. 11, 2023

(54) ROTOR BLADE LEAD-LAG HYDRAULIC DAMPER WITH CENTRIFUGAL FORCE COMPENSATING DAMPING CHARACTERISTICS

(71) Applicant: Roller Bearing Company of America, Inc., Oxford, CT (US)

(72) Inventors: Mark Alger, Oro Valley, AZ (US); Randall Kohuth, Sun City, AZ (US); Dean Campbell, Tucson, AZ (US)

(73) Assignee: Roller Bearing Company of America, Inc., Oxford, CT (US)

(*) Notice: Subject to any disclaimer, the term of this patent is extended or adjusted under 35 U.S.C. 154(b) by 29 days.

(21) Appl. No.: 17/225,763

(22) Filed: Apr. 8, 2021

(65) Prior Publication Data

US 2021/0316850 A1 Oct. 14, 2021

Related U.S. Application Data

(60) Provisional application No. 63/007,460, filed on Apr. 9, 2020.

(51) Int. Cl.
*B64C 27/51* (2006.01)

(52) U.S. Cl.
CPC .................................... *B64C 27/51* (2013.01)

(58) Field of Classification Search
CPC .......... B64C 27/51; F16F 9/504; F16F 9/5126
See application file for complete search history.

(56) References Cited

U.S. PATENT DOCUMENTS

| | | | |
|---|---|---|---|
| 2,698,675 A | | 1/1955 | Rossman |
| 2,754,937 A | | 7/1956 | Buivid |
| 2,940,526 A | | 6/1960 | Vongerichten |
| 3,204,701 A | | 9/1965 | Muller et al. |
| 3,212,584 A | | 10/1965 | Young |
| 3,303,887 A | | 2/1967 | Pfleiderer |
| 3,638,885 A | | 2/1972 | Reed |
| 4,105,365 A | | 8/1978 | Ferris et al. |
| 4,549,850 A | | 10/1985 | Vincent |
| 5,219,430 A | * | 6/1993 | Antoine ................. F16F 9/512 416/106 |

(Continued)

FOREIGN PATENT DOCUMENTS

| | | |
|---|---|---|
| WO | 2012075236 A1 | 6/2012 |
| WO | 2020160105 A1 | 8/2020 |

*Primary Examiner* — Topaz L. Elliott
*Assistant Examiner* — Cameron A Corday
(74) *Attorney, Agent, or Firm* — Robinson & Cole LLP

(57) ABSTRACT

A piston assembly for a lead-lag damper for a blade mounted on a rotor of a helicopter includes a piston-rod that has an inside surface and a piston-head that extends radially outward therefrom. The piston-rod has two ports extending therethrough on opposing sides of the piston-head. A sleeve is positioned in the piston-rod and has two annular passages that communicate with the respective ports. A valve spool is disposed in and slidingly engages the sleeve. The valve spool has a channel which is in variable fluid communication with two passages. The piston assembly includes a biasing member that biases the valve spool axially away from it. The channel has an axial width configured to variably regulate fluid flow between the two ports to control dampening of the piston-rod in response to centrifugal forces applied to the valve spool.

18 Claims, 12 Drawing Sheets

(56) References Cited

U.S. PATENT DOCUMENTS

| | | | | |
|---|---|---|---|---|
| 5,501,434 | A | 3/1996 | McGuire | |
| 6,092,795 | A | 7/2000 | McGuire | |
| 6,676,074 | B2 | 1/2004 | Zoppitelli et al. | |
| 8,356,977 | B2 | 1/2013 | Jones et al. | |
| 8,764,396 | B2 | 7/2014 | Stamps et al. | |
| 8,857,581 | B2 | 10/2014 | Stamps et al. | |
| 8,985,950 | B2 | 3/2015 | Lopez et al. | |
| 9,004,466 | B2 | 4/2015 | Barnes et al. | |
| 9,457,898 | B2 | 10/2016 | Russell | |
| 9,765,825 | B2 | 9/2017 | Stamps et al. | |
| 9,879,753 | B2 | 1/2018 | McGill et al. | |
| 10,112,709 | B2 | 10/2018 | Heverly, II et al. | |
| 10,774,894 | B2 | 9/2020 | Jaskiewicz | |
| 11,549,656 | B2 * | 1/2023 | Kappelhoff | F21S 41/148 |
| 2003/0029684 | A1 * | 2/2003 | Forster | F16F 9/3485 188/282.5 |
| 2009/0159382 | A1 | 6/2009 | Chemouni et al. | |
| 2012/0141276 | A1 | 6/2012 | Fuhrer et al. | |
| 2015/0093245 | A1 | 4/2015 | Fuhrer et al. | |
| 2019/0367163 | A1 | 12/2019 | Bihel et al. | |

* cited by examiner 120
122X
122B
127G
128B
127R
150B
130B
152
150BQ
140
180
181
171
170B
160Y
160X
170R2
160G3
170G2
160R3
155B
BF
160P2
150H
150
151
160R2
V2
153
144
170C
160G2
155A
190B
D2
160P1
170R1
160R1
160F
160
152X
122
152
190E
D1
150A
160G1
170
170G1
190

122B
127G
128B
127R
150
181
D22
160Y
180
170R2
171
160R3
170G2
W70
V2
BF
155B
160G3
150H
160R2
W2
160P2
160G2
W1
170C
155A
160R1
160P1
170R1
152
152X
170G1
D21
190B
160G1
160A
160

122B
128B
127R
127G
150B
130B
152
150BQ
140
D32
160Y
180
181
160R3
170R2
171
170B
170G2
160G3
155B
BF
150
V3
160P2
160G2
160R2
151
155A
190B
160R1
D2
170C
160PI
122
160F
152X
D31
160G1
152
160
D1
150A
170R1
170
170G1
190

122B
127G
128B
127R
130B
150B
180
181
D32
160Y
170R2
160R3
170G2
170G3
160G3
V3
W70
BF
155B
160R2
150H
W2
160P2
170C
W1
160G2
155A
170R1
160P1
152
170G1
160R1
170
190B
D31
152X
160G1
160A
160

High Pressure
Low Pressure
F1
122
150B
160P2
152
V1
155B
150H
150
155A
160P1
170C
160
190
150A
170

500
580
552X2
560X
555B
560P2
570C
555A
560P1
552X
560
550
570

ROTOR BLADE LEAD-LAG HYDRAULIC DAMPER WITH CENTRIFUGAL FORCE COMPENSATING DAMPING CHARACTERISTICS

CROSS REFERENCE TO RELATED APPLICATION

This application claims priority to commonly owned and U.S. Provisional Patent Application No. 63/007,460, filed Apr. 9, 2020, the entirety of which is incorporated herein by reference.

TECHNICAL FIELD

The invention relates to a damper for a helicopter and more particularly to a rotor blade lead-lag hydraulic damper with centrifugal force compensating damping characteristics.

BACKGROUND

As shown in FIG. 1, a prior art helicopter rotor blade assembly is generally designated by the numeral 100. The blade assembly 100 includes a rotor 10 that is rotatable about a rotor axis 10A in the direction indicated by the arrow R1. The helicopter rotor 10 is shown with four blades 12A, 12B, 12C and 12D. Rotor blade lead-lag dampers are used on fully articulating rotor heads with 3 or more blades; usage of one damper per blade. As shown in FIG. 1, a radially innermost portion 12X of the blade 12A is pivotally connected to the rotor 10 by a link 14 which accommodates angular lead-lag blade rotation about a lead-lag pivot axis P in the back and forth directions indicated by the arrow R2. The blade assembly 100 includes lead-lag damper 20 that is connected to the rotor 10 and a portion of the radially innermost portion 12X of the blade 12A. The lead-lag damper 20 dampens the reciprocating motion by extending and retracting in the direction of the arrow R3 to control the velocity of the blade motion in the direction of the arrow R2.

A blade flap axis is designated by the letter B which connotes blade flap movement that is represented by pivoting of the blade 12A relative to the rotor axis (i.e., in FIG. 1 such movement would be in and out of the page). In addition, a blade pitch axis is designated by the letter C. The blade 12A is pivotable coaxially with the blade pitch axis C.

The prior art dampers 20 generally provide constant damping, independent of the angular rotational speed of the rotor 10. Such constant damping results in high heat generation in the damper 20. Adequate dissipation of the heat requires the damper 20 to have a larger surface area which results in a larger and heavier damper, which is undesirable for helicopters.

SUMMARY

There is disclosed herein a piston-rod extending from a first piston-rod axial end to a second piston-rod axial end. The piston rod includes a tubular member that has an interior area defined by a first inside surface and a second inside surface. A piston-head extends radially outward from the piston-rod. The piston head is located between the first piston-rod axial end and the second piston-rod axial end. The piston head has a first axial face that faces towards the first piston-rod axial end and a second axial face that faces towards the second piston-rod axial end. A first port extends through the piston-rod and is located axially away from a first axial face of the piston-head. A second port extends through the piston-rod and is located axially away from a second axial face of the piston-head. The piston assembly includes a sleeve positioned in the piston-rod and which engages the second inside surface. The sleeve has a first annular passage that is in fluid communication with the first port and a second annular passage that is in fluid communication with the second port. The sleeve has an interior engagement surface therein. The piston assembly includes a valve spool that is disposed in the sleeve and slidingly engages the interior engagement surface. The valve spool has a radially outward opening channel which is in variable fluid communication with the first annular passage and the second annular passage. The piston assembly includes a biasing member that engages the valve spool such that the valve spool is biased axially away from the second port. The channel has an axial width of a magnitude configured to variably regulate fluid flow (e.g., hydraulic fluid flow) between the first port and the second port to variably control dampening of the piston-rod in response to centrifugal forces applied to the valve spool, generated by rotation of the rotor.

In one embodiment, in a maximum damping position, the channel extends substantially across a first axial width of the first annular passage and the channel extends across a first percentage of the second axial width of the second annular passage.

In one embodiment, in an intermediate (e.g., moderate) damping position, the channel extends substantially across a first axial width of the first annular passage and the channel extends across a second fraction of a second axial width of the second annular passage.

In one embodiment, in a minimum damping position, the channel extends substantially across a first axial width of the first annular passage and the channel extends substantially across a second axial width of the second annular passage.

In one embodiment, the piston assembly includes a calibration mass (e.g., a controlled mass) that is positioned in the piston-rod and slidingly engages the inside surface. In one embodiment, the controlled mass abuts an axial end of the valve spool. In one embodiment, the controlled mass is integrally formed with the valve spool.

There is disclosed herein a lead-lag damper for a helicopter blade that includes a housing that has an inside surface that defines an inner chamber that extends from a first axial housing end to a second axial housing end thereof. A first shaft extends from the first axial housing end and connects to a rotor. A first bore extends axially through the second axial housing end of the housing into the inner chamber. A second shaft extends through the first bore and into the first chamber. The lead lag damper includes a piston assembly which includes a piston-rod that extends from a first piston-rod axial end to a second piston-rod axial end. The piston rod includes a tubular member that has an interior area defined by a first inside surface and a second inside surface. A piston-head extends radially outward from the piston-rod and is located between the first piston-rod axial end and the second piston-rod axial end. The piston head has a first axial face that faces towards the first piston-rod axial end and a second axial face that faces towards the second piston-rod axial end. A first port extends through the piston-rod and is located axially away from the first axial face of the piston-head. A second port extending through the piston-rod and is located axially away from the second axial face of the piston-head. A sleeve is positioned in the piston-rod. The sleeve engages the second inside surface. The sleeve has a first annular passage that is in fluid communication with the first port and a second annular passage that is in fluid communication with the second port. The sleeve has an interior engagement surface. A valve spool is disposed in the sleeve and slidingly engages the interior engagement surface. The valve spool has a radially outward opening channel which is in variable fluid communication with the first annular passage and the second annular passage. A biasing member engages the valve spool such that the valve spool is biased axially away from the second port. The channel has an axial width of a magnitude configured to variably regulate fluid flow between the first port and the second port to variably control dampening of the piston-rod in response to centrifugal forces applied to the valve spool, generated by rotation of a rotor of the helicopter blade. The piston-rod is disposed in the inner chamber. A radially outermost circumferential surface of the piston-head is in sliding engagement with the inside surface. The piston-head bifurcates the inner chamber into a first inner volume and a second inner volume. The second shaft is connected to the second piston-rod end of the piston-rod.

There is disclosed herein a valve arrangement for a lead-lag damper for a blade mounted on a rotor of a helicopter. The valve arrangement includes a sleeve that has a first annular passage and a second annular passage formed in the sleeve and that has an interior engagement surface therein. A valve spool is disposed in the sleeve and slidingly engages the interior engagement surface. The valve spool has a radially outward opening channel which is in variable fluid communication with the first annular passage and the second annular passage. A biasing member engages the valve spool such that the valve spool is biased axially away from second annular passage. The channel has an axial width of a magnitude configured to variably regulate fluid flow between first annular passage and the second annular passage to variably control flow of fluid through the valve arrangement in response to centrifugal forces applied to the valve spool.

There is further disclosed herein a housing assembly for a lead-lag damper for a blade mounted on a rotor of a helicopter. The housing assembly includes a housing-body that includes a wall structure that is formed by an auxiliary outer wall and an inner wall. The wall structure has a valve interior area formed in the wall structure between the outer wall and the inner wall. The valve interior area is defined by a valve inside surface A first port extends from the valve interior area and through the inner wall and a second port extends from the interior area and through the inner wall. The second port is located axially away from the first port. A sleeve is positioned in the interior area. The sleeve has a first annular passage that is in fluid communication with the first port and a second annular passage in fluid communication with the second port. The sleeve has an interior engagement surface. A valve spool is disposed in the sleeve and slidingly engages the interior engagement surface. The valve spool has an exterior surface that has a radially opening channel which is in variable fluid communication with the first annular passage and the second annular passage. A biasing member engages the valve spool such that the valve spool is biased axially away from the second port. The channel has an axial width of a magnitude configured to variably regulate fluid flow between the first port and the second port to variably control damping of the housing-body in response to centrifugal forces applied to the valve spool, generated by rotation of the rotor.

In one embodiment, the valve interior area has a cylindrical bore extending axially into the wall structure.

In a maximum damping position, the channel extends substantially across a first axial width of the first annular passage and the channel extends across a first percentage of the second axial width of the second annular passage.

In an intermediate damping position, the channel extends substantially across a first axial width of the first annular passage and the channel extends across a second fraction of a second axial width of the second annular passage.

In a minimum damping position, the channel extends substantially across a first axial width of the first annular passage and the channel extends substantially across a second axial width of the second annular passage.

The housing assembly also includes a calibration mass positioned in the interior area and that slidingly engages the valve inside surface. In one embodiment, the calibration mass abuts an axial end of the valve spool. However, in another embodiment, the calibration mass is integrally formed with the valve spool.

The housing assembly includes a piston-rod that has a piston head that extends radially outward therefrom. The piston head has an exterior circumferential surface hat is in sliding engagement with a housing inside surface. The piston head is positioned in a main interior area of the housing assembly. The piston head is slidable between the first port and the second port.

DETAILED DESCRIPTION

Figure 1:
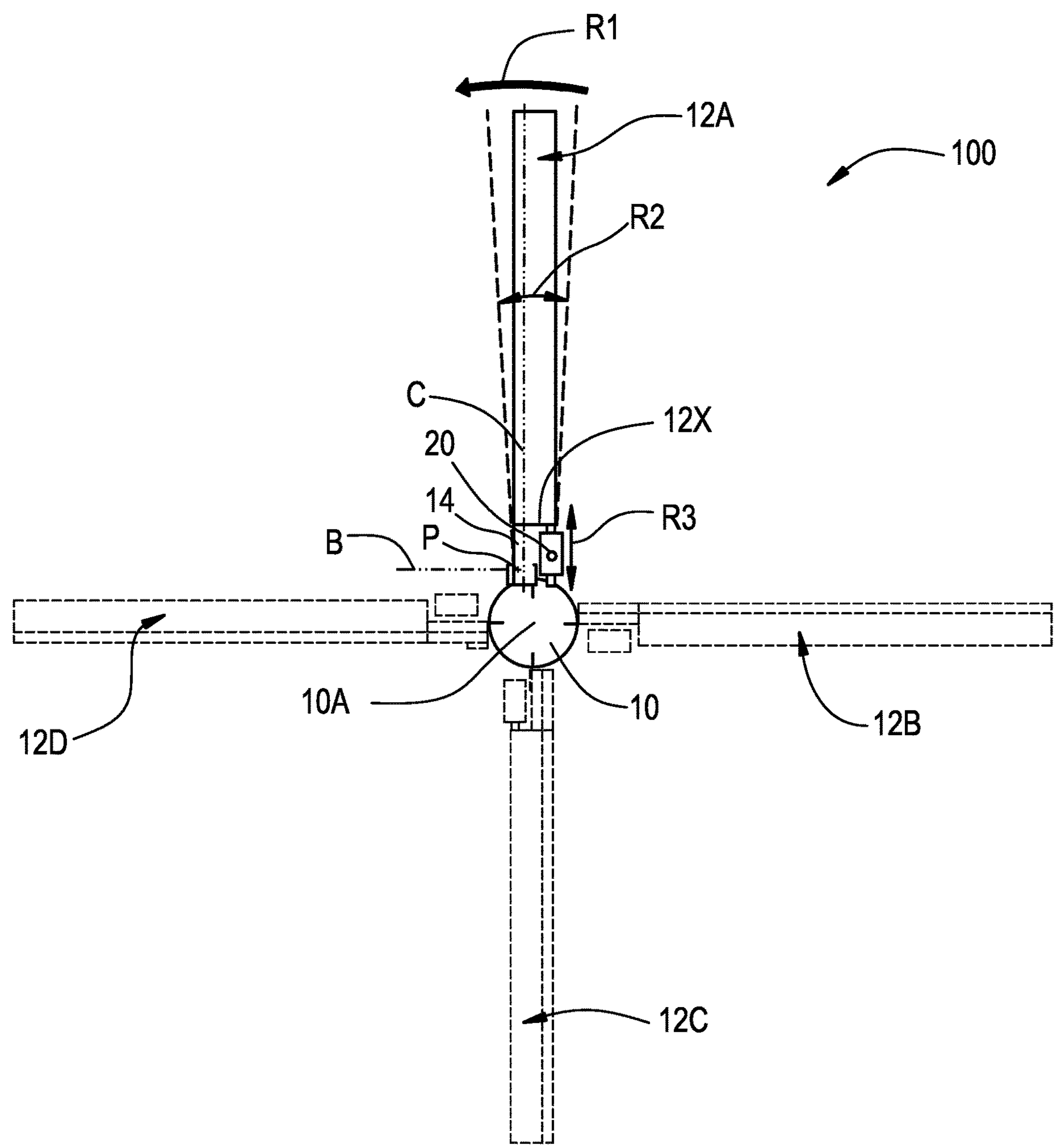
FIG. 1 is a schematic diagram of a prior art helicopter rotor showing damper and lead-lag motion.
Figure 2:
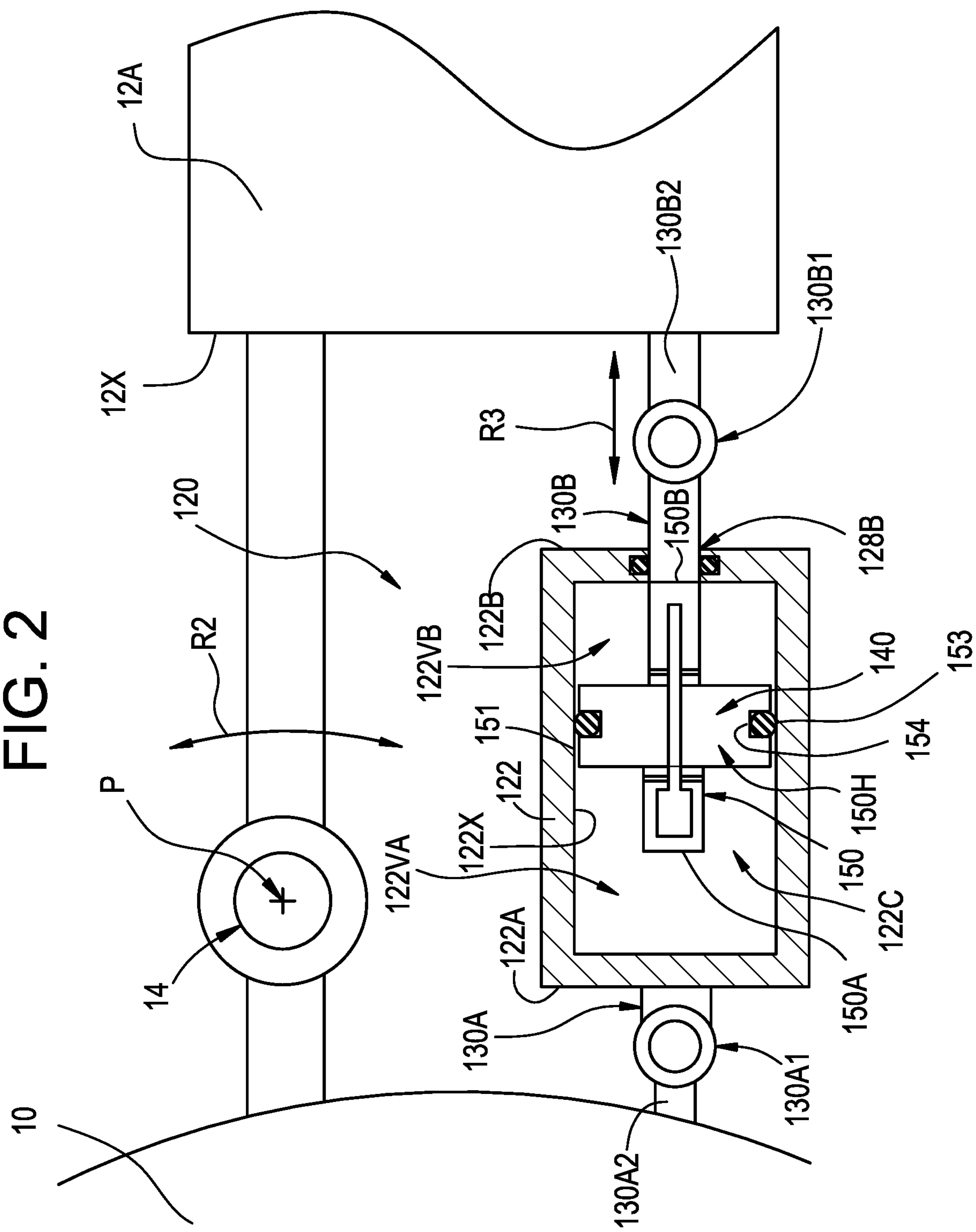
FIG. 2 is a cross sectional schematic view of the damper of the present invention shown without internal components inside the piston-rod.

As illustrated in FIG. 2, a lead-lag damper for a helicopter blade is generally designated by the numeral 120. The damper 120 includes a housing 122 that has an inside surface 122X. The inside surface 122X defines an inner chamber 122C that extends from a first axial housing end 122A to a second axial housing end 122B of the housing 122. A first shaft 130A extends from the first axial housing end 122A and connects to a rotor 10 via a bearing 130A1 and an extension shaft 130A2. A first bore 128B extends axially through the second axial housing end 122B into the inner chamber 122C. A second shaft 130B slides axially in the first bore 128B.

As shown in FIG. 2, one end of the second shaft 130B is connected to the second piston-rod end 150B of the piston-rod 150.

The opposing end of the second shaft 130B is connected to a radially innermost portion 12X of the blade 12A via a bearing 130B1. In particular, the second shaft 130B is connected to the bearing 130B1 which is connected to an extension shaft portion 130B2 of the second shaft 130B; and the extension shaft portion 130B2 is fixedly connected to the radially innermost portion 12X of the blade 12A. The radially innermost portion 12X of the blade 12A is pivotally connected to the rotor 10 by a hinge link 14 which accommodates angular lead-lag blade rotation about a lead-lag pivot axis P in the back and forth directions indicated by the arrow R2.

Figure 3A:
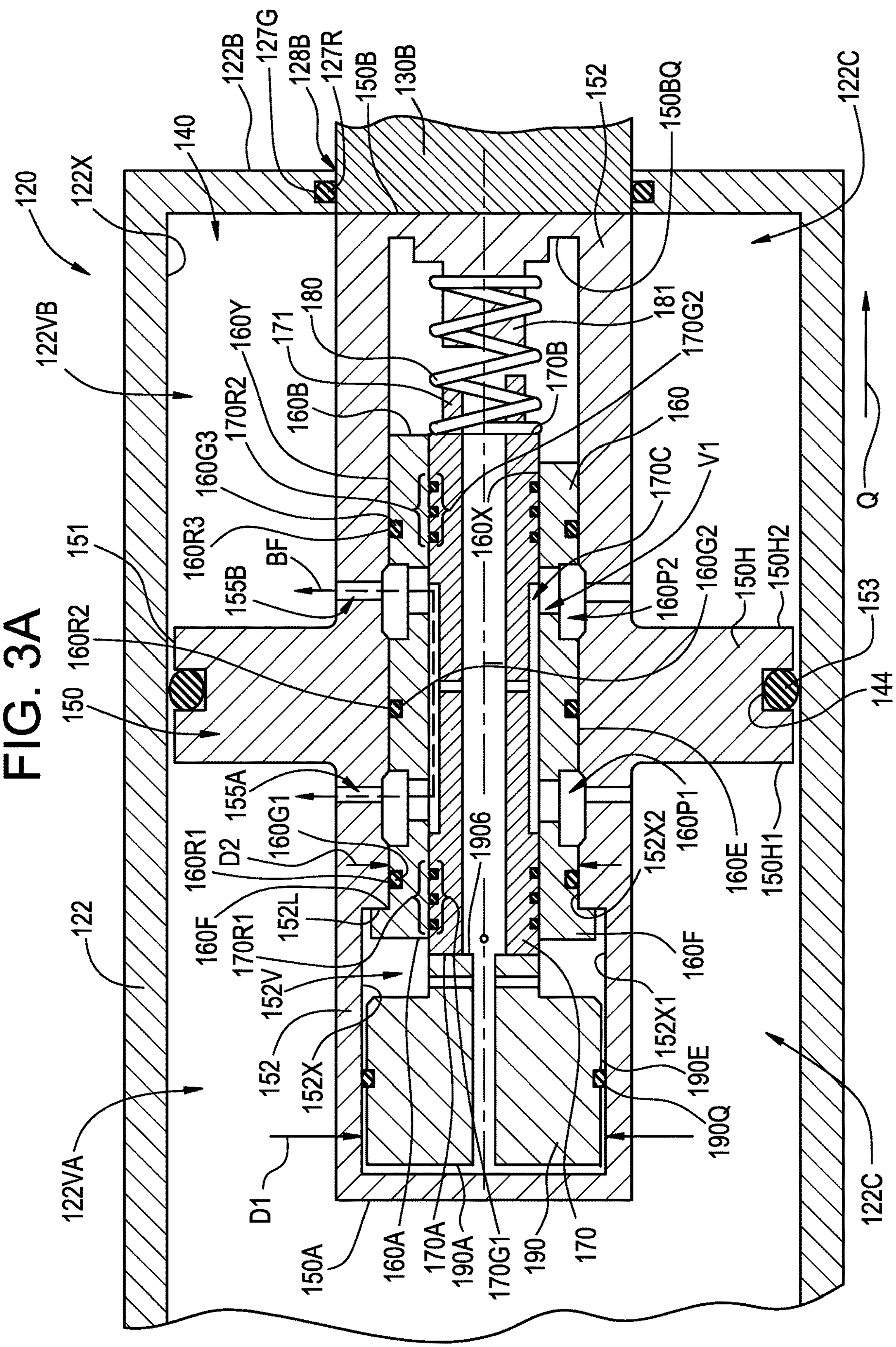
FIG. 3A is a cross sectional diagram of the portion of a damper of the present invention of portion of the damper of FIG. 2, shown with a spool position at about 0% rotor speed and with maximum damping.

As best shown in FIG. 3A, the piston assembly 140 includes aa piston-rod 150 that extends from a first piston-rod axial end 150A to a second piston-rod axial end 150B. The piston rod 150, is disposed in the inner chamber 122C. The piston rod 150 is shown, for example, as a tubular member 152 that has an interior area 152V defined by a first inside surface 152X and a second inside surface 152X2. The first inside surface 152X is substantially cylindrical and extends from the first piston-rod axial end 150A towards the second piston-rod axial end 150B and terminates therebetween at a shoulder 152L. The second inside surface 152X2 is substantially cylindrical and extends from the shoulder 152L towards the second piston-rod axial end 150B. The first inside surface 152X has a first inside diameter D1 and the second inside surface 152X2 has a second inside diameter D2 that has a magnitude less than that of the first inside diameter D1. A piston-head 150H extends radially outward from the piston-rod 150 and is located between the first piston-rod axial end 150A and the second piston-rod axial end 150B. The piston head 150H has a first axial face 150H1 that faces towards the first piston-rod axial end 150A. The piston head has a second axial face 150H2 that faces towards the second piston-rod axial end 150B. A first port 155A extends through the piston-rod 150 and is located axially away from a first axial face 150H1 of the piston-head 150H. A second port 155B extends through the piston-rod 150 and is located axially away from the second axial face 150H2 of the piston-head 150H.

As shown in FIG. 3A, a radially outermost circumferential surface 151 of the piston-head 150H is in sliding engagement with the inside surface 122X and the piston-head 150H. The radially outermost circumferential surface 151 has a groove 154 formed therein. A seal 153 (e.g., an O-ring) is disposed in the groove 154 and seals against the inside surface 122X and the innermost radial surface of the groove 154. The piston-head 150H bifurcates the inner chamber 122C into a first inner volume 122VA and a second inner volume 122VB.

As shown in FIG. 3A, a sleeve 160 is positioned in the piston-rod 150 and engages the second inside surface 152X2. The sleeve 160 has a first annular passage 160P1 in fluid communication with the first port 155A. The second annular passage 160P2 in fluid communication with the second port 155B. Each of the first annular passage 160P1 and the second annular passage 160P2 have one or more holes extending radially therethrough. The sleeve 160 is a hollow tubular member and has a cylindrical exterior surface 160E that extends from a first axial sleeve end 160A to a second axial sleeve end 160B thereof. The exterior surface 160E sealingly engages the second inside surface 152X2 of the piston-rod 150. The exterior surface 160E has three grooves with annular seals therein to assist in the sealing of the sleeve 160 to the second inside surface 152X2, as described further herein. A flange 160F extends radially outward from the first sleeve end 160A.

As shown in FIG. 3A, an axial surface 160F (i.e., an axial surface that faces away from the first axial sleeve end 160A) of the flange 160F engages the shoulder 152L formed on the inside surface 152X. The sleeve 160 has a cylindrical exterior surface 160Y that has a first annular groove 160G1 formed therein that is located axially between the flange 160F and the first annular passage 160P1. A seal 160R1 (e.g., an elastomeric O-ring) is positioned in the first groove 160G1 and sealingly engages the second inside surface 152X2 between the shoulder 152L and the first port 155A. The cylindrical exterior surface 160Y that has a second annular groove 160G2 formed therein that is located axially between the first annular passage 160P1 and the second annular passage 160P2. A seal 160R2 (e.g., an elastomeric O-ring) is positioned in the second groove 160G2 and sealingly engages the second inside surface 152X2 between the first port 155A and the second port 155B. The cylindrical exterior surface 160Y that has a third annular groove 160G3 formed therein that is located axially between the second annular passage 160P2 and the second axial end 160B of the sleeve 160. A seal 160R3 (e.g., an elastomeric O-ring) is positioned in the third groove 160G3 and sealingly engages the second inside surface 152X2 between the second port 155B and the second axial end 160B of the sleeve 160. Thus, the sleeve 160 is fixed relative to and in sealing engagement with the piston-rod 150. The sleeve 160 also has an interior area that is defined by an interior engagement surface 160X, for example, a cylindrical surface.

Figure 3B:
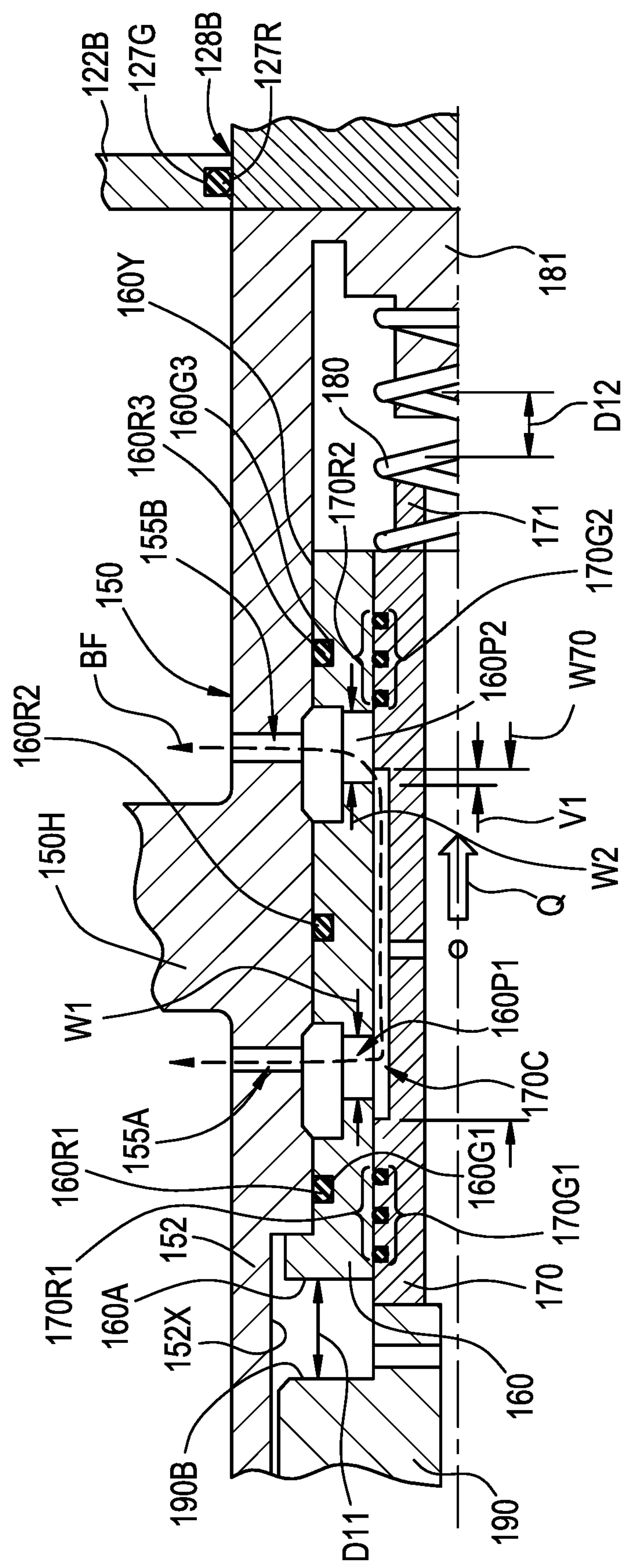
FIG. 3B is an enlarged view of the channel portion of the valve spool, sleeve annular passages and the ports in the piston-bod of FIG. 3A.

As shown in FIG. 3B, a valve spool 170 is disposed in the interior area of the sleeve 160. The valve spool 170 is a hollow tubular member that extends from a first axial spool end 170A to a second axial spool end 170B. The valve spool 170 has a generally cylindrical exterior surface 170E that slidingly engages (i.e., moves axially inside the interior area of the sleeve 160) the three grooves 170G1.

The valve spool 170 has a radially outward opening channel 170C which is in variable fluid communication with the first annular passage 160P1 and the second annular passage 160P2. For example, the channel 170C exposes increasing portions of the second annular passage 160P2 as the valve spool 170 moves in the sleeve in the direction of the arrow Q in response to centrifugal forces imparted on the valve spool 170.

As shown in FIG. 3A, the exterior surface 170E of the valve spool 170 has a first set of three grooves 170G1 located between the first axial spool end 170A and the channel 170C. The exterior surface 170E of the valve spool 170 is a close fit to the 170R1 region of the engagement surface 160X of the sleeve 160. The valve spool 170 has a second set of three grooves 170G2 located between the channel 170C and the second axial spool end 170B. The exterior surface 170E of the valve spool 170 is a close fit to the 170R2 region of the engagement surface 160X of the sleeve 160.

As shown in FIG. 3B, the valve spool 170 has a first spring carrier 171 extending axially from the second spool end 170B. A second spring carrier 181 is secured to an axial inside surface 150BQ of the second piston-rod end 150B of the piston-rod 150. A biasing member 180 (e.g., a coil spring) is guided by the first spring carrier 171 and the second spring carrier 181. A first end 180A of the biasing member 180 engages the second spool end 170B of the valve spool 170 and a second end 180B of the biasing member 180 engages the axial inside surface 150BQ of the second piston-rod end 150B. The biasing member 180 applies force thereto such that the valve spool 170 is biased axially away from the second port 155B.

Figure 4A:
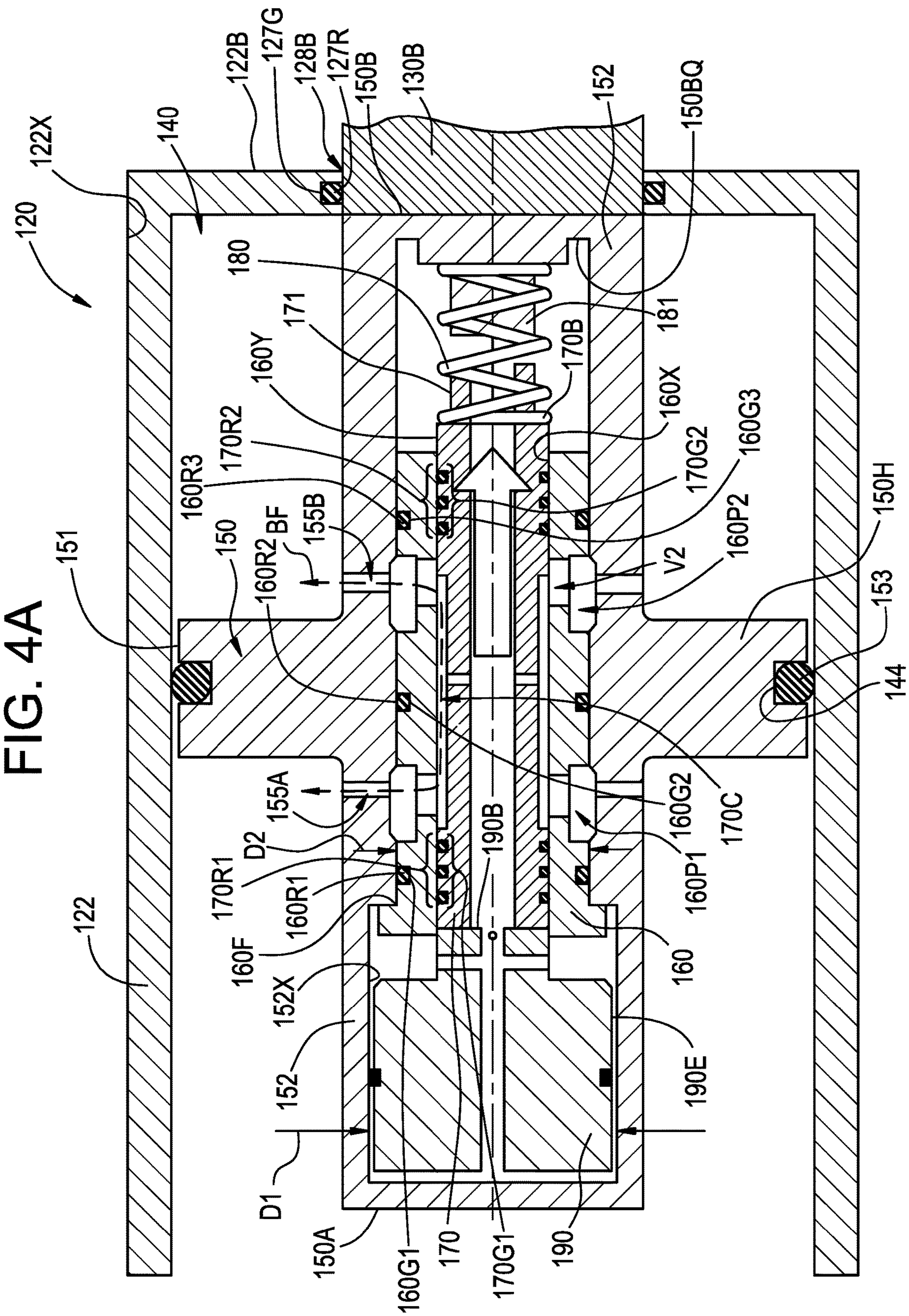
FIG. 4A is a cross sectional diagram of a portion of a damper of the present invention of a portion of the damper of FIG. 2, shown with a spool position at about 50% rotor speed and with moderate damping.
Figure 4B:
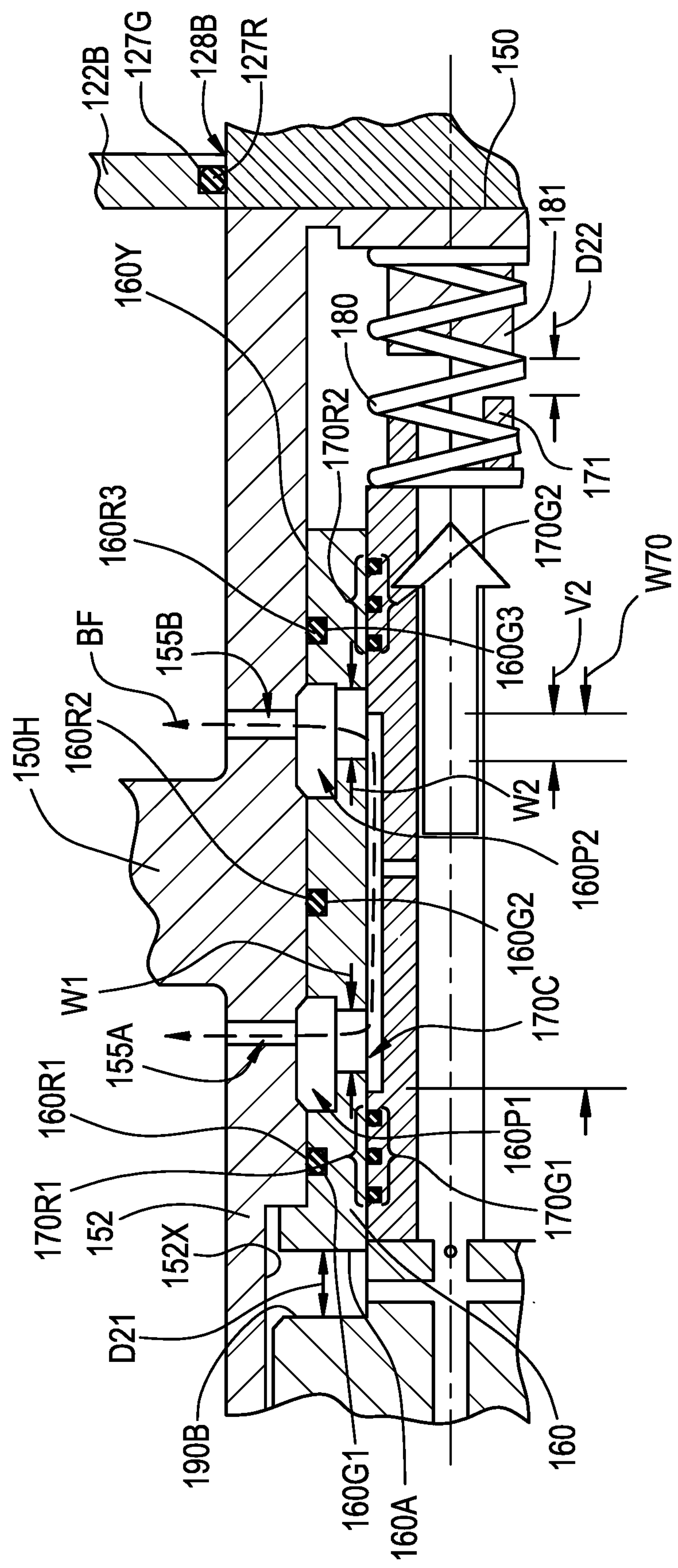
FIG. 4B is an enlarged view of the channel portion of the valve spool, sleeve annular passages and the ports in the piston-rod of FIG. 4A.
Figure 5A:
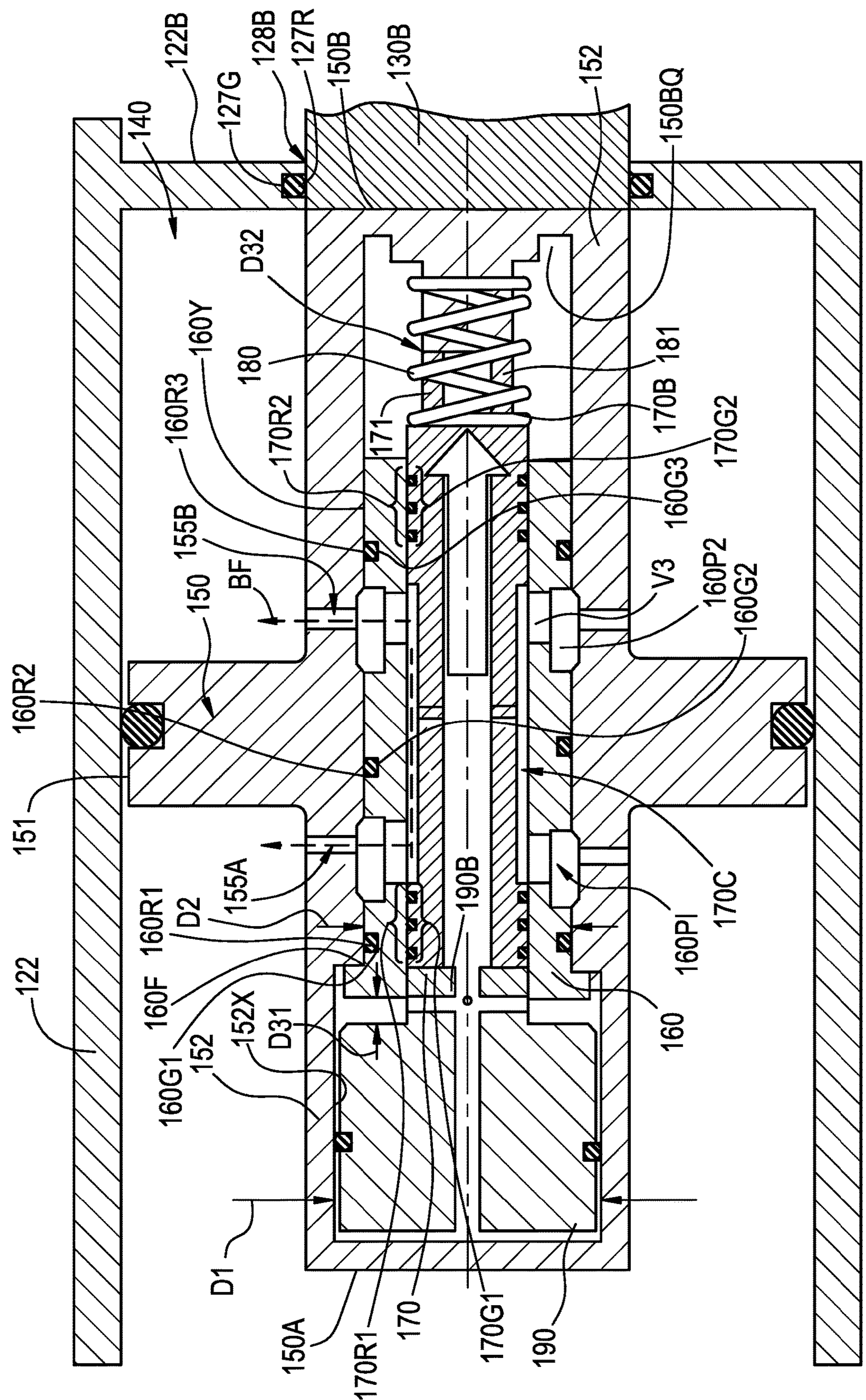
FIG. 5A is a cross sectional diagram of a portion of a damper of the present invention of portion of the damper of FIG. 2, shown with a spool position at about 100% rotor speed and with minimum damping.
Figure 5B:
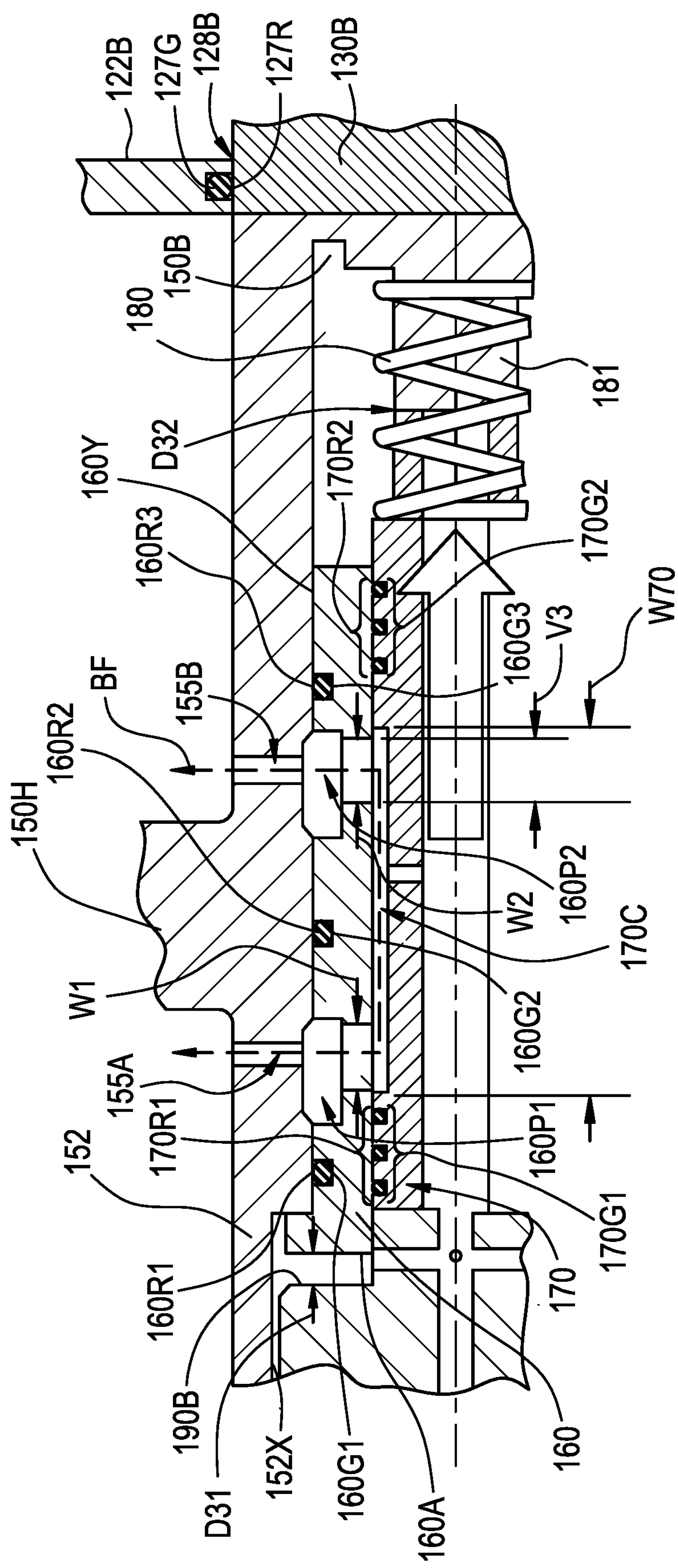
FIG. 5B is an enlarged view of the channel portion of the valve spool, sleeve annular passages and the ports in the piston-rod of FIG. 5A.

As best shown in FIGS. 3B, 4B and 5B, the channel 170C has an axial width W70 of a magnitude configured to variably regulate fluid flow between the first port 155A and the second port 155B as illustrated by the dashed arrow BF to variably control dampening of the piston-rod 150 in response to centrifugal forces applied to the valve spool 170, generated by rotation of the rotor.

As shown in FIG. 3B, in a maximum damping position, the channel 170C extends fully across the first axial width W1 (e.g., W1 fully open) of the first annular passage 160P1 and the channel 170C extends across and opens only a small portion of a second axial width W2 of the second annular passage 160P2 thereby establishing a first flow area V1. The amount of opening of the second axial width W2 is sized to achieve the required damping rate per aircraft specifications. The first flow area V1 is so small that the fluid flow BF is constricted enough to result in maximum damping (i.e., minimizes the velocity of the piston-rod 150 in the housing 122) of the piston-rod 150 in the housing 122. In the maximum damping position illustrated in FIG. 3B the first spring carrier 171 is spaced apart from the second spring carrier 181 by a distance D12 and the axial end 190B of a calibration mass 190 is spaced apart from the first axial end 160A of the sleeve 160 by a distance D11 which is slightly greater than the distance D12.

As shown in FIG. 4B, in an intermediate (e.g., moderate) damping position, the channel 170C remains fully extended across the first axial width W1 (e.g., W1 fully open) of the first annular passage 160P1 and the channel 170C extends across a second fraction of the second axial width W2 of the second annular passage 160P2 thereby establishing a second flow area V2. The amount of opening of the second axial width W2 in this intermediate damping position is sized to achieve the required damping rate per aircraft specifications. The second flow area V2 is larger than the first flow area V1 such that the fluid flow BF is less constricted than in the maximum damping position and results in the intermediate damping of the piston-rod 150 in the housing 122. In the intermediate damping position illustrated in FIG. 4B the first spring carrier 171 is spaced apart from the second spring carrier 181 by a distance D22 and the axial end 190B of a calibration mass 190 is spaced apart from the first axial end 160A of the sleeve 160 by a distance D21 which is greater than the distance D22. The distance D22 is less than the distance D12 and the distance D21 is less than the distance D11.

As shown in FIG. 5B, in minimum damping position, the channel 170C remains fully extended across the first axial width W1 (e.g., W1 fully open) of the first annular passage 160P1 and the channel 170C fully extends across the second axial width W2 (e.g. W2 fully open) of the second annular passage 160P2 thereby establishing a third flow area V3. The third flow area V3 is larger than the second flow area V2 such that the fluid flow BF is less constricted than in the intermediate damping position and results in the minimum damping of the piston-rod 150 in the housing 122. In the minimum damping position illustrated in FIG. 5B the first spring carrier 171 abuts the second spring carrier 181 as designated by D32 and the axial end 190B of a calibration mass 190 is spaced apart from the first axial end 160A of the sleeve 160 by a distance D31 which is greater than zero. The distance D31 is less than the distance D21.

As shown in FIGS. 3A, 4A and 5A, the piston assembly 140 includes a calibration mass 190 that extends from a first axial end 190A to a second axial end 190B and is positioned in the piston-rod 150. An exterior surface 190E of the calibration mass 190 slidingly engages the first inside surface 152X of the piston-rod 150. The exterior surface 190E has a circumferential groove that has a low friction wear-ring 190Q disposed therein to assist in reducing sliding friction with the inside surface 152X. The calibration mass 190 has a mass magnitude that is calibrated with the centrifugal force and forces applied by the biasing member 180. In one embodiment, the calibration mass 190 abuts an axial end of the valve spool 170. In one embodiment, the calibration mass 190 is integrally formed with the valve spool 170. While the calibration mass 190 is shown and described as abutting the axial end of the valve spool 170, the present invention is not limited in this regard as the calibration mass 190 may interact with or engage the valve spool in other locations.

The calibration mass 190 will always be in contact with the valve spool 170, whether displacing to the right pushing against the spring 180 with increasing centrifugal force due to increasing rotor head speed or returning to the left due to the spring force overcoming the decreasing centrifugal force with decreasing rotor head speed. The calibration mass 190 always pushes on the first axial end 170A of the valve spool 170 whenever the rotor head is turning.

Figure 6A:
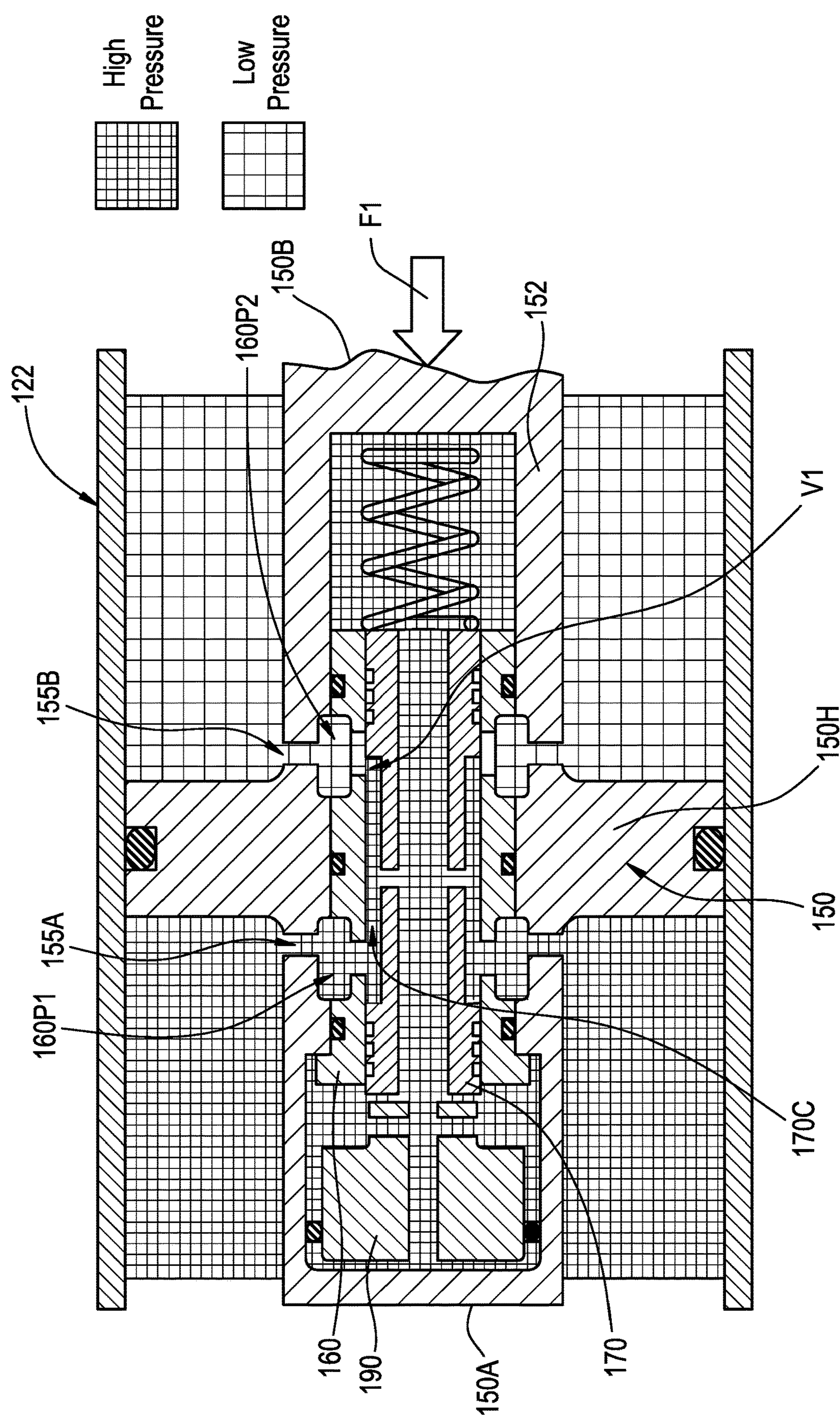
FIG. 6A is a cross sectional diagram of FIG. 3A and showing pressure distribution with a radially inwardly directed force applied to the damper.

As shown in FIG. 6A, when the rotor blade 12A (FIG. 2) applies a force F1 to force the piston-rod 150 to the left in FIG. 6A, pressure increases as designated by the dense checkered cross hatching, on the left side of the piston-head 150H and pressure decreases as designated by the light checkered cross hatching on the right side of the piston-head 150H. The higher pressure is required to pass freely around the calibration mass 190 and the valve spool 170 so these components are pressure balanced. The pressure does not put any forces on the calibration mass 190 or the valve spool 170. Instead, only the centrifugal force and biasing member 180 apply forces to the valve spool 170 and calibration mass 190. Hydraulic fluid is transferred from the left side to the right side of the piston-head 150H through the flow area V1.

Figure 6B:
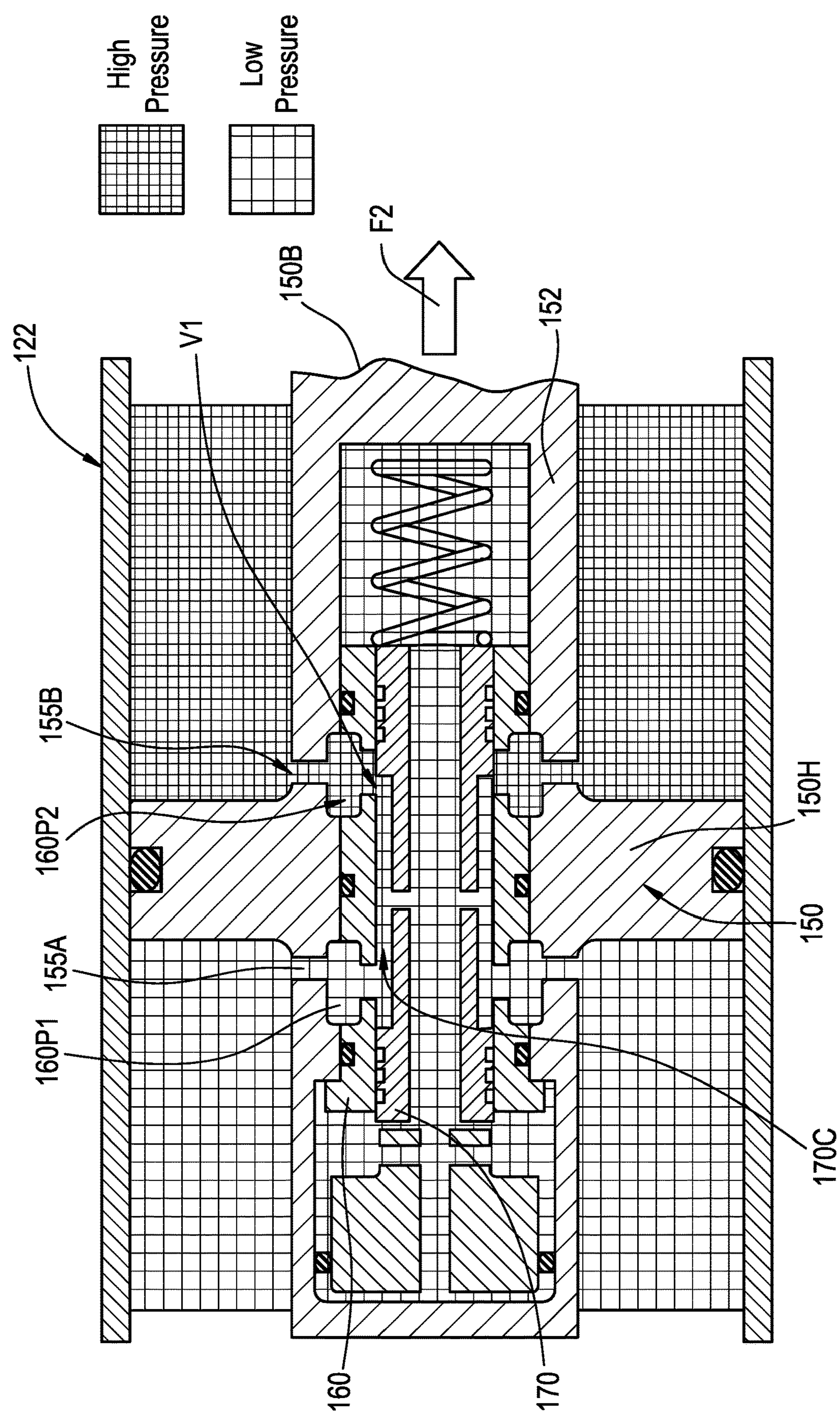
FIG. 6B is a cross sectional diagram of FIG. 3A and showing pressure distribution with a radially outwardly directed force applied to the damper.

As shown in FIG. 6B, when the rotor blade 12A (see FIG. 2) applies a force F2 to force the piston-rod 150 to the right in FIG. 6B, pressure increases as designated by the dense checkered cross hatching on the right side of the piston head 150H and pressure decreases light checkered cross hatching on the left side of the piston-head 150H. The lower pressure is communicated around the calibration mass 190 and the valve spool 170 to maintain the pressure balance. Hydraulic fluid is transferred from the right side to the left side of the piston-head 150H through the flow area V1.

Figure 7:
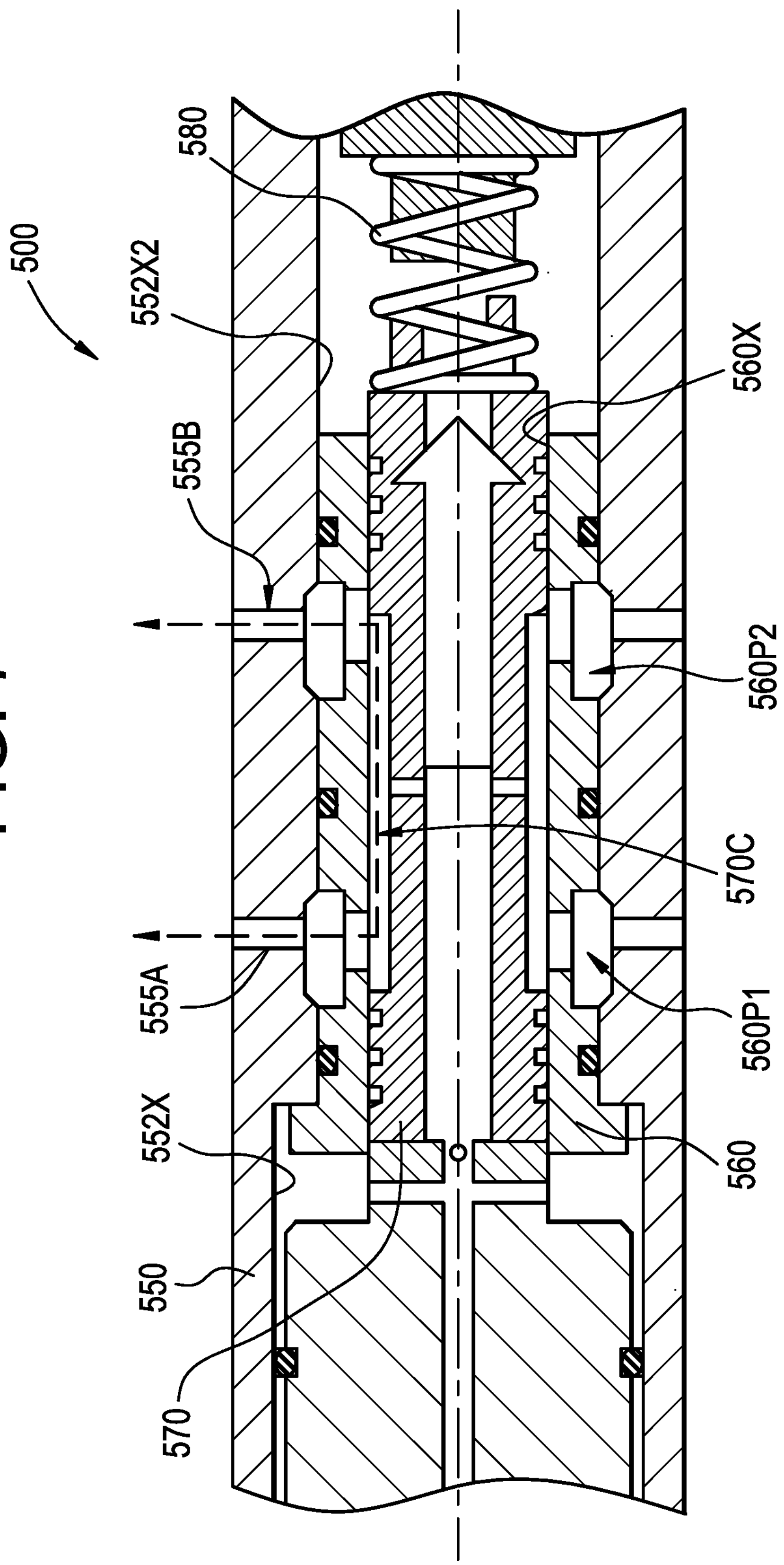
FIG. 7 is a cross sectional diagram of a valve arrangement of the present invention.

As shown in FIG. 7, a valve arrangement for a lead-lag damper for a blade mounted on a rotor of a helicopter is generally designated by the numeral 500. The valve arrangement includes a sleeve 560 that has a first annular passage 560P1 and a second annular passage 560P2 formed in the sleeve 560. The sleeve 560 has an interior engagement surface 560X, for example, a substantially cylindrical surface. The valve arrangement 500 includes a valve spool 570 that is disposed in the sleeve 560 and slidingly engages the interior engagement surface 560X. The valve spool 570 has a radially outward opening channel 570C which is in variable fluid communication with the first annular passage 560P1 and the second annular passage 560P2. The valve arrangement includes a biasing member 580 that engages the valve spool 570 such that the valve spool 570 is biased axially away from second annular passage 560P2. The channel 570C has an axial width of a magnitude configured to variably regulate fluid flow between first annular passage 560P1 and the second annular passage 560P2 and into respective ports 555A and 555B that extend through a casing 550. The valve arrangement is configured to variably control flow of fluid therethrough in response to centrifugal forces applied to the valve spool 570.

Figure 8A:
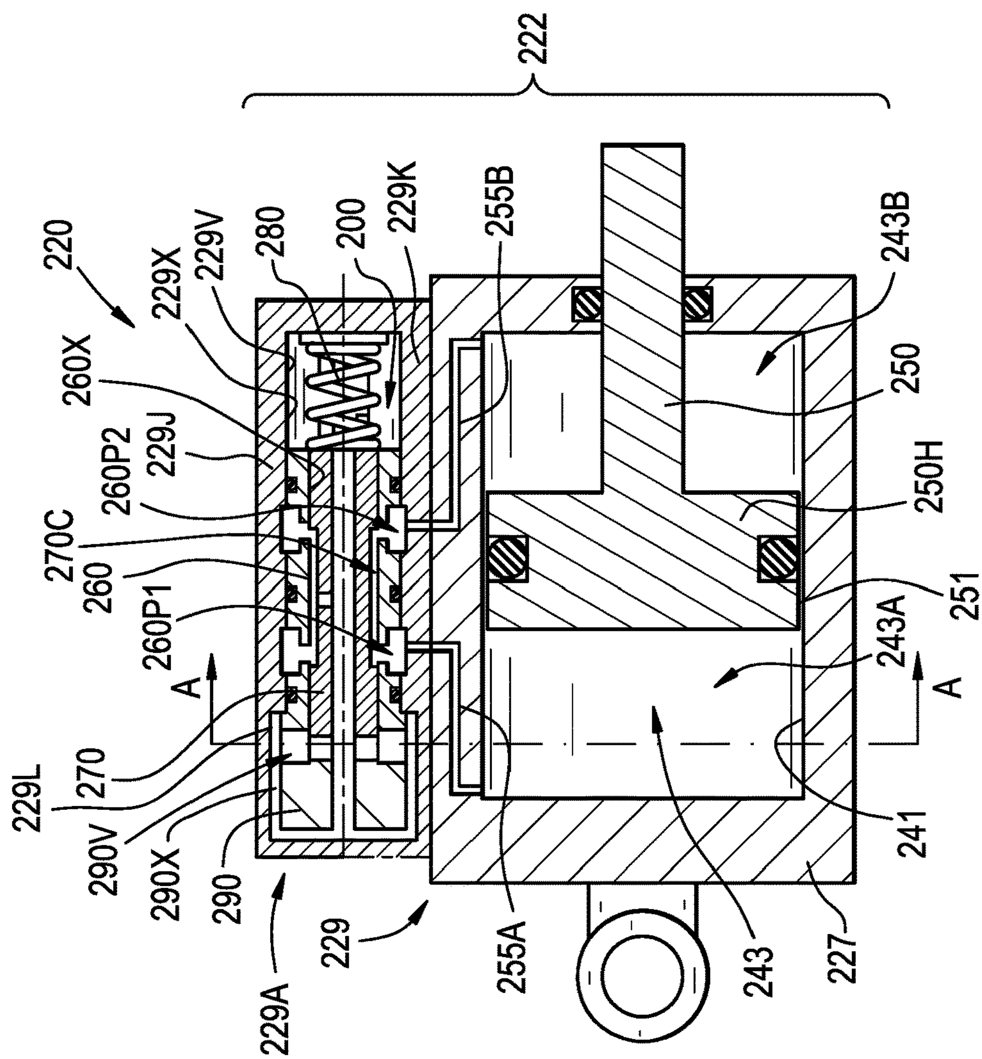
FIG. 8A is a cross sectional view of a housing assembly with a damper of the present invention.
Figure 8B:
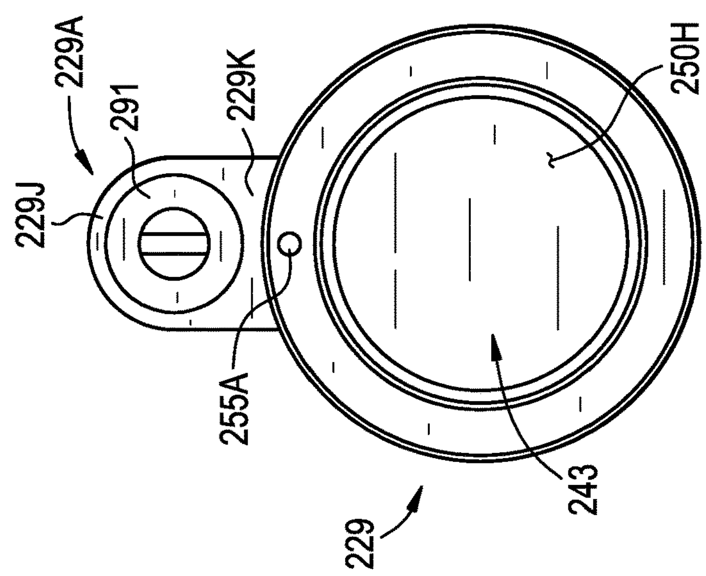
FIG. 8B is a side sectional view across section A of FIG. 8A.

As shown in FIGS. 8A and 8B, a housing assembly for a lead-lag damper for a blade mounted on a rotor of a helicopter is generally designated by the numeral 222. The housing assembly 222 includes a housing-body 229 that is formed by a generally cylindrical wall structure 227 and an auxiliary housing body 229A secured thereto. The auxiliary housing body 229A has an outer wall 229J and an inner wall 229K. The inner wall 229K is attached to an arcuate segment of the wall structure 227. The auxiliary housing body 229A has an auxiliary valve interior area 229V formed therein between the outer wall 229J and the inner wall 229K. The valve interior area 229V is defined by a cylindrical valve inside surface 229X. A portion 290X of the valve inside surface 229X has an increased diameter extending via a shoulder 229L to the remaining portion of the valve inside surface 229X. The wall structure 229 also encloses a main interior area 243. A first port 255A extends from the valve interior area 229V, through the inner wall 229K and into a first section 243A of the main interior area 243. A second port 255B extends from the valve interior area 229V, through the inner wall 229K and into a second section 243B of the main interior area 243. The second port 255B is located axially away from the first port 255A.

As shown in FIGS. 8A and 8B, a valve arrangement 200 similar to the valve arrangement 500 shown and described with reference to FIG. 7, is disposed in the valve interior area 229V. The valve arrangement 200 includes a sleeve 260 positioned in the valve interior area 229V. The sleeve 260 is configured similar to the sleeve 160 shown and described with reference to FIG. 3A. The sleeve 260 has a first annular passage 260P1 that is in fluid communication with the first port 255A and a second annular passage 260P2 that is in fluid communication with the second port 255B. The sleeve 260 has an interior engagement surface 260X.

As shown in FIGS. 8A and 8B, a valve spool 270 is disposed in the sleeve 260 and slidingly engages the interior engagement surface 260X. The valve spool 270 is similar to the valve spool 170 shown and described with reference to FIG. 3A. The valve spool 270 has an exterior surface that has a radially opening channel 270C. The channel 270C is in variable fluid communication with the first annular passage 260P1 and the second annular passage 260P2.

As shown in FIGS. 8A and 8B, the valve arrangement 200 includes a biasing member 280 that is configured similar to the biasing member 180 shown and described with reference to FIG. 3A. The biasing member 280 engages the valve spool 270 such that the valve spool 270 is biased axially away from the second port 255B.

The channel 270C is configured similar to the channel 170C shown and described with reference to FIG. 3A. Thus, the channel 270C has an axial width of a magnitude configured to variably regulate fluid flow between the first port 255A and the second port 255B to variably control damping of the piston-rod 250 in response to centrifugal forces applied to the valve spool 270, generated by rotation of the rotor.

The valve interior area 229V has a cylindrical bore that extends axially into the wall structure 229.

The valve arrangement 200 operates similar to the valve arrangement shown and described with reference to FIGS. 3A-6B. Thus, in a maximum damping position, the channel 270C extends substantially across a first axial width W1 of the first annular passage 260P1 and the channel 270C extends across a first percentage of the second axial width W2 of the second annular passage 260P2. In an intermediate damping position, the channel 270C extends substantially across a first axial width W1 of the first annular passage 260P1 and the channel 270C extends across a second fraction of a second axial width W2 of the second annular passage 260P2. In a minimum damping position, the channel 270C extends substantially across a first axial width W1 of the first annular passage 260P1 and the channel 270C extends substantially across a second axial width W2 of the second annular passage 260P2.

The valve arrangement 200 includes a calibration mass 290 positioned in the interior area 290V and slidingly engages the portion 290X of the valve inside surface 229X. The calibration mass 290 abuts an axial end of the valve spool 270 or the calibration mass 290 can be integrally formed with the valve spool 270.

As shown in FIGS. 8A and 8B, a piston-rod 250 extends through a housing bore 227B that is formed through a housing axial end 227D of the housing 227. The housing bore 227B has a circumferential groove 227G formed therein. A seal 227R is positioned in the circumferential groove 227G. The piston rod 250 slidingly and sealingly engages the seal 227R. The piston rod 250 has a piston head 250H extending radially outward therefrom. The piston head 250H has an exterior circumferential surface 251 that is in sliding engagement with a housing inside surface 241. The piston head is positioned in a main interior area 243 of the housing assembly 222. The piston head 250H is slidable between the first port 255A and the second port 255B. The piston head 250H has a circumferential groove 250G formed there in and a seal 250R (e.g., an O-ring) is positioned in the groove 250G and is in sealing and sliding engagement with the housing inside surface 241.

While the housing assembly 222 shown and described in FIGS. 8A and 8B illustrate a valve arrangement 200 disposed in the auxiliary valve interior area 229V, the present invention is not limited in this regard, as more than one of the valve arrangement 200 may be employed in respective ones of additional auxiliary valve interior areas or an annular valve arrangement that circumferentially surrounds the main interior area 243 and employs an annular valve spool that circumferentially surrounds the main interior area 243.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A piston assembly for a lead-lag damper for a blade mounted on a rotor of a helicopter, the piston assembly comprising:

a piston-rod extending from a first piston-rod axial end to a second piston-rod axial end, the piston-rod comprising a tubular member having an interior area defined by a first inside surface and a second inside surface, a piston-head extending radially outward from the piston-rod and located between the first piston-rod axial end and the second piston-rod axial end, the piston head having a first axial face facing towards the first piston-rod axial end and a second axial face facing towards the second piston-rod axial end, a first port extending through the piston-rod and located axially away from the first axial face of the piston-head and a second port extending through the piston-rod and located axially away from the second axial face of the piston-head;

a sleeve positioned in the piston-rod and engaging the second inside surface, the sleeve having a first annular passage in fluid communication with the first port and a second annular passage in fluid communication with the second port, the sleeve having an interior engagement surface;

a valve spool disposed in the sleeve and slidingly engaging the interior engagement surface, the valve spool having a radially outward opening channel which is in variable fluid communication with the first annular passage and the second annular passage;

a biasing member engaging the valve spool such that the valve spool is biased axially away from the second port; and wherein the channel has an axial width of a magnitude configured to variably regulate fluid flow between the first port and the second port to variably control dampening of the piston-rod in response to centrifugal forces applied to the valve spool, generated by rotation of the rotor.

2. The piston assembly of claim 1, wherein in a maximum damping position, the channel extends substantially across a first axial width of the first annular passage and the channel extends across a first percentage of the second axial width of the second annular passage.

3. The piston assembly of claim 1, wherein in an intermediate damping position, the channel extends substantially across a first axial width of the first annular passage and the channel extends across a second fraction of a second axial width of the second annular passage.

4. The piston assembly of claim 1, wherein in a minimum damping position, the channel extends substantially across a first axial width of the first annular passage and the channel extends substantially across a second axial width of the second annular passage.

5. The piston assembly of claim 1, further comprising a calibration mass positioned in the piston-rod and slidingly engaging the first inside surface.

6. The piston assembly of claim 5, wherein the calibration mass abuts an axial end of the valve spool.

7. The piston assembly of claim 5, wherein the calibration mass is integrally formed with the valve spool.

8. A lead-lag damper for a helicopter blade, the damper comprising:

a housing having an inside surface that defines an inner chamber that extends from a first axial housing end to a second axial housing end, a first bore extending through the second axial housing end into the inner chamber;

a first shaft connected to the first axial housing end of the housing;

a second shaft extending through the first bore of the housing;

a piston assembly comprising:

a piston-rod extending from a first piston-rod axial end to a second piston-rod axial end, the piston-rod comprising a tubular member having an interior area defined by a first inside surface and a second inside surface, a piston-head extending radially outward from the piston-rod and located between the first piston-rod axial end and the second piston-rod axial end, the piston head having a first axial face facing towards the first piston-rod axial end and a second axial face facing towards the second piston-rod axial end, a first port extending through the piston-rod and located axially away from the first axial face of the piston-head and a second port extending through the piston-rod and located axially away from the second axial face of the piston-head;

a sleeve positioned in the piston-rod and engaging the second inside surface, the sleeve having a first annular passage in fluid communication with the first port and a second annular passage in fluid communication with the second port, the sleeve having an interior engagement surface;

a valve spool disposed in the sleeve and slidingly engaging the interior engagement surface, the valve spool having a radially outward opening channel which is in variable fluid communication with the first annular passage and the second annular passage;

a biasing member engaging the valve spool such that the valve spool is biased axially away from the second port; and wherein the channel has an axial width of a magnitude configured to variably regulate fluid flow between the first port and the second port to variably control dampening of the piston-rod in response to centrifugal forces applied to the valve spool, generated by rotation of a rotor of the helicopter blade;

the piston-rod being disposed in the inner chamber, a radially outermost circumferential surface of the piston-head being in sliding engagement with the inside surface and the piston-head bifurcating the inner chamber into a first inner volume and a second inner volume; and the second shaft being connected to the second piston-rod axial end of the piston-rod.

9. A valve arrangement for a lead-lag damper for a blade mounted on a rotor of a helicopter, the valve arrangement comprising:

a sleeve having a first annular passage and a second annular passage formed in the sleeve and having an interior engagement surface;

a valve spool disposed in the sleeve and slidingly engaging the interior engagement surface, the valve spool having a radially outward opening channel which is in variable fluid communication with the first annular passage and the second annular passage;

a biasing member engaging the valve spool such that the valve spool is biased axially away from second annular passage; and wherein the channel has an axial width of a magnitude configured to variably regulate fluid flow between first annular passage and the second annular passage to variably control flow of fluid through the valve arrangement in response to centrifugal forces applied to the valve spool.

10. A housing assembly for a lead-lag damper for a blade mounted on a rotor of a helicopter, the housing assembly comprising:

a housing-body comprising a wall structure having an outer wall and an inner wall, the wall structure having a valve interior area formed in the wall structure between the outer wall and the inner wall, the valve interior area being defined by a valve inside surface, a first port extending from the interior area and through the inner wall and a second port extending from the interior area and through the inner wall, the second port being located axially away from the first port;

a sleeve positioned in the valve interior area, the sleeve having a first annular passage in fluid communication with the first port and a second annular passage in fluid communication with the second port, the sleeve having an interior engagement surface;

a valve spool disposed in the sleeve and slidingly engaging the interior engagement surface, the valve spool having an exterior surface having a radially opening channel which is in variable fluid communication with the first annular passage and the second annular passage;

a biasing member engaging the valve spool such that the valve spool is biased axially away from the second port; and wherein the channel has an axial width of a magnitude configured to variably regulate fluid flow between the first port and the second port to variably control damping of the piston-rod in response to centrifugal forces applied to the valve spool, generated by rotation of the rotor.

11. The housing assembly of claim 10, wherein the valve interior area comprises a cylindrical bore extending axially into the wall structure.

12. The housing assembly of claim 10, wherein in a maximum damping position, the channel extends substantially across a first axial width of the first annular passage and the channel extends across a first percentage of a second axial width of the second annular passage.

13. The housing assembly of claim 10, wherein in an intermediate damping position, the channel extends substantially across a first axial width of the first annular passage and the channel extends across a second fraction of a second axial width of the second annular passage.

14. The housing assembly of claim 10, wherein in a minimum damping position, the channel extends substantially across a first axial width of the first annular passage and the channel extends substantially across a second axial width of the second annular passage.

15. The housing assembly of claim 10, further comprising a calibration mass positioned in the valve interior area and slidingly engaging a portion of the valve inside surface.

16. The housing assembly of claim 15, wherein the calibration mass abuts an axial end of the valve spool.

17. The housing assembly of claim 15, wherein the calibration mass is integrally formed with the valve spool.

18. A lead-lag damper for a helicopter blade, the damper comprising:

a housing assembly of claim 10;

a piston-rod having a piston head extending radially outward therefrom, the piston head having an exterior circumferential surface that is in sliding engagement with a housing inside surface, and the piston head being positioned in a main interior area of the housing assembly, the piston head being slidable between the first port and the second port.

* * * * *